United States Patent
Jainek

(10) Patent No.: US 6,644,624 B2
(45) Date of Patent: Nov. 11, 2003

(54) LIQUID DISCHARGE ASSEMBLY

(75) Inventor: Herbert Jainek, Heilbronn (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/052,913

(22) Filed: Jan. 23, 2002

(65) Prior Publication Data

US 2002/0104980 A1 Aug. 8, 2002

Related U.S. Application Data

(63) Continuation of application No. PCT/EP00/07040, filed on Jun. 21, 2000.

(30) Foreign Application Priority Data

Jul. 23, 1999 (DE) .......................................... 199 33 849

(51) Int. Cl.⁷ .............................................. B01D 27/08
(52) U.S. Cl. .................................... 251/149.6; 210/235
(58) Field of Search .......................... 251/149.1, 149.6, 251/149.9; 210/235, 451, 452

(56) References Cited

U.S. PATENT DOCUMENTS

| | | | | |
|---|---|---|---|---|
| 4,622,136 A | * | 11/1986 | Karcey | ....................... 210/168 |
| 4,903,942 A | * | 2/1990 | Licciardello et al. | ..... 251/149.1 |
| 4,936,544 A | * | 6/1990 | Bartholomew | ........... 251/149.6 |
| 5,049,269 A | * | 9/1991 | Shah | .................... 251/149.6 X |
| 5,066,391 A | * | 11/1991 | Faria | ............................ 210/85 |
| 5,609,195 A | * | 3/1997 | Stricklin et al. | ..... 251/149.1 X |
| 5,630,570 A | * | 5/1997 | Lacroix et al. | ........... 251/149.9 |
| 5,695,168 A | * | 12/1997 | Williams | .................. 251/149.4 |
| 5,695,633 A | * | 12/1997 | Ernst et al. | .................. 210/130 |
| 5,744,030 A | * | 4/1998 | Reid et al. | ............ 251/149.6 X |
| 5,785,693 A | * | 7/1998 | Haining | ................ 251/149.6 X |
| 5,988,705 A | * | 11/1999 | Norkey | ................. 251/149.6 X |
| 6,032,926 A | * | 3/2000 | Fuchs | .................. 251/149.1 X |
| 6,062,537 A | * | 5/2000 | Chih | ........................ 251/149.6 |

* cited by examiner

Primary Examiner—Gene Mancene
Assistant Examiner—Eric Keasel
(74) Attorney, Agent, or Firm—Crowell & Moring LLP

(57) ABSTRACT

A quick-connect coupling for opening a valve to allow discharge of a liquid. The coupling is particularly suited for discharging motor oil from the oil pan or oil filter of an internal combustion engine. The coupling includes at least one latching element which engages the valve in order to open it. The other end of the quick-connect coupling is preferably connected to a hose that leads, in turn, to an oil collection vessel.

1 Claim, 1 Drawing Sheet

LIQUID DISCHARGE ASSEMBLY

CROSS REFERENCE TO RELATED APPLICATIONS

This application is a continuation of international patent application No. PCT/EP00/07040, filed Jun. 21, 2000, designating the United States of America, the entire disclosure of which is incorporated herein by reference. Priority is claimed based on Federal Republic of Germany patent application no. DE 199 33 849.3, filed Jul. 23, 1999.

BACKGROUND OF THE INVENTION

The present invention relates to a liquid discharge assembly including a quick-connect coupling for opening a valve. Quick-connect couplings of this type are known, for example, in house and garden applications and serve to connect hoses and the like. In many fields of application such quick-connect couplings cannot be used because they do not satisfy the high performance standards required, for instance, for tanks containing hot media or aggressive media.

Threaded connections for oil discharge are provided, for example, on internal combustion engines or on an oil filter mounted to an internal combustion engine. To drain the oil from the tank or the filter, these threaded connections must be unscrewed to unblock an opening. In some cases, oil is also drained from the filter by unscrewing the cover of the filter housing.

A drawback of these systems is that the oil is discharged in an undefined manner and there is an undesirable risk of spillage and consequent environmental contamination.

SUMMARY OF THE INVENTION

It is an object of the invention is to provide a liquid discharge assembly including a new quick-connect coupling for opening a valve.

Another object of the invention is to provide a liquid discharge assembly including a quick-connect coupling facilitates reliable actuation of a valve.

A further object of the invention is to provide a liquid discharge assembly including a quick-connect coupling which is capable of withstanding high thermal stress or other adverse conditions.

These and other objects are achieved in accordance with the present invention by providing a liquid discharge assembly including a quick-connect coupling for opening a discharge valve positioned in a liquid discharge, wherein said coupling comprises at least one latching element which snaps into the discharge valve to open the valve when the coupling is applied to the liquid discharge, and wherein said quick-connect coupling is connected with a discharge hose.

The invention thus provides a liquid discharge in which discharged liquid is guided directly into a hose. To this end, a valve is provided on a container for the liquid, for instance, an oil pan or an oil filter, which is suspended from an internal combustion engine. This valve seals a discharge opening. The required seating thrust is applied by a pressure spring. To open the valve, a quick-connect coupling is snapped on.

The advantage of the invention is that the liquid can be discharged from the container or the filter without any risk of spillage or environmental contamination.

In one preferred embodiment of the invention, a snap-connection mechanism is arranged on the quick-connect coupling. This snap-connection mechanism comprises a rocker arm, which latchingly interacts with suitable detent or locking elements of the valve. This latching engagement prevents any unintentional detachment of the quick-connect coupling.

In accordance with another preferred embodiment of the invention, the valve comprises a valve plate and a pressure spring, which assures a reliable seal between the valve plate and a valve seat. The pressure of the liquid inside the tank or the filter produces additional seating thrust to prevent any unintentional opening of the valve during operation.

In accordance with a further embodiment, a pressure control valve is provided in the container to limit the pressure.

In accordance with yet another embodiment of the invention, the pressure control valve and the discharge valve are operatively linked in that the support for the pressure control valve simultaneously forms the mounting for the discharge valve. This creates a compact unit of pressure control valve and discharge valve. This unit can be adapted to the liquid container or the filter housing.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figures 1, 2:
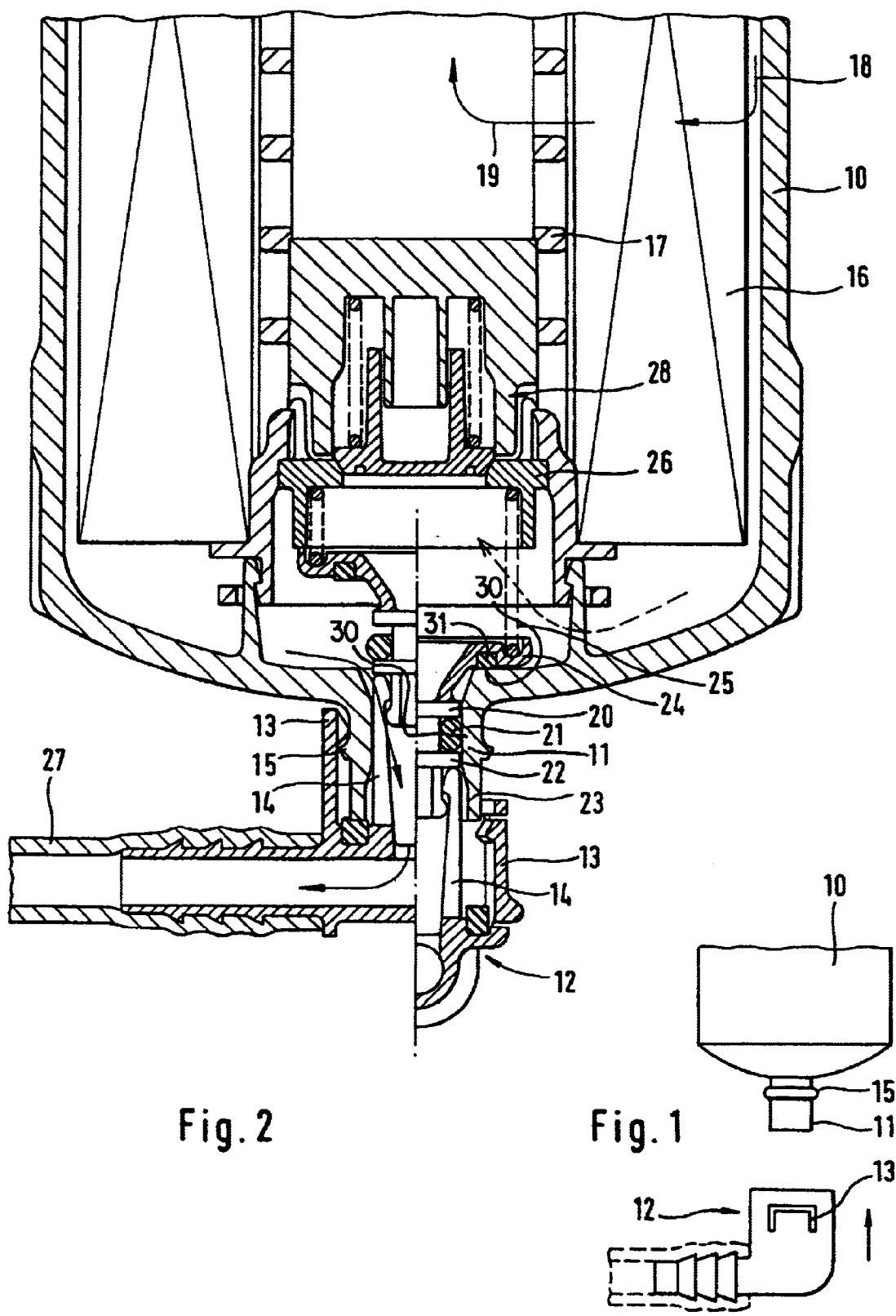
FIG. 1 is a schematic illustration of the operative connection between an oil filter housing and a quick-connect coupling.
FIG. 2 is a partial sectional view of an oil filter housing with a quick-connect coupling.

FIG. 1 schematically shows an oil filter housing 10, which has an outlet or discharge 11 that is closed by a valve (see FIG. 2). A quick-connect coupling 12, which has at least one rocker arm 13, is provided to open this outlet. When the quick-connect coupling 12 is snapped on, this rocker arm extends over and engages behind a hump or bead 15 on the oil filter housing to cause latching.

FIG. 2, in the right-hand half section, illustrates how the quick-connect coupling 12 is snapped onto outlet 11. The left-hand half-section shows the quick-connect coupling 12 firmly connected with the oil filter housing when the valve is open allowing the liquid or oil to be discharged.

In the oil filter housing 10, there is a concentrically arranged filter element 16, which is fixed to a supporting body 17. Oil flows through an unfiltered liquid inlet into the oil filter housing. As indicated by arrow 18, the oil flows through the filter element 16 and leaves the housing through supporting body 17 as indicated by arrow 19 and through a filtered liquid outlet (not shown).

Discharge outlet 11 is sealed by a valve. This valve comprises a valve plate 20 provided with an O-ring 21. Said O-ring is accommodated behind a bulge or bead 22 and seals the opening 23 of the outlet 11. The valve plate 20 is provided with a receptacle 24 for a pressure spring 25, which is braced against a support 26. This pressure spring urges the valve plate 20 and a seal 31 against a discharge valve seat 30 and holds the valve in the closed position shown here. Mounted on this support is a pressure control valve 29 that seals an opening between the unfiltered liquid area and the filtered liquid area in known manner.

In the right-hand half-section of FIG. 2, the quick-connect coupling 12 is shown in the position of initial contact, i.e., the position in which the latching elements 14 merely rest in contact with the valve. Likewise, the rocker arm 13 is positioned in front of the outlet 11 and thus does not yet contact the oil filter housing 10. The quick-connect coupling 12 is provided with a hose 27. This hose extends to an oil collecting vessel (not shown).

The left-hand half-section illustrates the operative connection between the valve and the quick-connect coupling. The latching element 14 has moved the valve with valve plate 20 in upward direction, so that opening 23 is unblocked. The oil contained in the oil filter housing can be discharged through hose 27. The latched connection between the quick-connect coupling and the oil filter housing is effected with the aid of rocker arm 13, which extends over hump or bead 15 and permits the quick-connect coupling to be removed only when a predetermined pull-off force is applied to the connection.

After the oil has been discharged completely, the quick-connect coupling can be pulled off again. The valve closes reliably and the oil filter housing can then be refilled.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A liquid discharge assembly comprising a quick-connect coupling for opening a discharge valve positioned in a liquid discharge, wherein the discharge valve comprises a valve elate that is urged against a discharge valve seat by a pressure spring to form a seal, the coupling comprising:

at least one latching element which snaps onto the discharge valve and opens the valve when the coupling is applied to the liquid discharge;

a latching mechanism comprising at least one rocker arm which latchingly engages behind a hump or bead on the liquid discharge when the coupling is applied to the liquid discharge, wherein the at least one latching element engages the discharge valve and pushes the valve plate away from the discharge valve seat to open the discharge valve when the coupling is applied to the liquid discharge;

wherein said liquid discharge is arranged on an oil filter housing; a filter element is provided in said oil filter housing to separate an unfiltered oil area from a filtered oil area, and a pressure control valve is provided between the unfiltered oil area and the filtered area; and wherein said pressure control valve engages a pressure control valve seat formed on a support for the pressure spring which urges the discharge valve against the discharge valve seat.

\* \* \* \* \*